(12) United States Patent
Foster et al.

(10) Patent No.: US 6,240,492 B1
(45) Date of Patent: May 29, 2001

(54) MEMORY INTERFACE FOR FUNCTIONAL UNIT OF INTEGRATED SYSTEM ALLOWING ACCESS TO DEDICATED MEMORY AND SHARED MEMORY, AND SPECULATIVE GENERATION OF LOOKAHEAD FETCH REQUESTS

(75) Inventors: Eric M. Foster, Owego; Steven B. Herndon, Endicott; Chuck H. Ngai, Endwell, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/083,849

(22) Filed: May 22, 1998

(51) Int. Cl.$^7$ ...................................................... G06F 12/00
(52) U.S. Cl. .......................... 711/149; 711/147; 711/169; 382/166
(58) Field of Search .................................... 711/147, 149, 711/151, 169, 167; 382/166

(56) References Cited

U.S. PATENT DOCUMENTS

| | | | |
|---|---|---|---|
| 4,713,748 | 12/1987 | Magar et al. | 364/200 |
| 4,912,636 | 3/1990 | Magar et al. | 364/200 |
| 4,968,977 | * 11/1990 | Chinnaswamy et al. | 340/825.8 |
| 5,175,841 | 12/1992 | Magar et al. | 395/425 |
| 5,212,742 | * 5/1993 | Normile et al. | 382/166 |
| 5,577,230 | 11/1996 | Argade et al. | 395/477 |
| 5,586,299 | * 12/1996 | Wakerly | 711/149 |
| 5,636,361 | 6/1997 | Ingerman | 395/477 |
| 5,638,520 | 6/1997 | Moyer | 395/308 |
| 5,664,223 | 9/1997 | Bender et al. | 395/842 |
| 5,682,522 | * 10/1997 | Huang et al. | 345/512 |
| 5,708,784 | 1/1998 | Yanai et al. | 395/299 |
| 5,761,727 | * 6/1998 | Wu et al. | 711/147 |
| 5,819,014 | * 10/1998 | Cyr et al. | 358/1.15 |

FOREIGN PATENT DOCUMENTS 3-189868    8/1991    (JP) ................................. G06F/15/31

* cited by examiner

Primary Examiner—Do Hyun Yoo
Assistant Examiner—Nasser Moazzami
(74) Attorney, Agent, or Firm—William H. Steinberg; Heslin & Rothenberg, P.C.

(57) ABSTRACT

A memory interface for an integrated system is presented which allows simultaneous, transparent access to multiple external memories coupled thereto. The memory interface resides within a functional unit of the integrated system and includes multiple memory ports, at least one of which is coupled to dedicated memory and one port to shared memory. The dedicated memory comprises private memory for the functional unit, while the shared memory is common memory coupled to the functional unit and other functional units of the integrated system. The memory interface has a controller for forwarding memory fetch requests generated by requesting units within the functional unit to the proper memory port as determined at system initialization. A lookahead request generator is employed for generating speculative lookahead fetch requests within the memory interface using information on received memory fetch requests and known memory access patterns. The lookahead fetch requests retrieve data from external memory in anticipation of actual memory fetch requests being generated.

46 Claims, 8 Drawing Sheets

MEMORY INTERFACE FOR FUNCTIONAL UNIT OF INTEGRATED SYSTEM ALLOWING ACCESS TO DEDICATED MEMORY AND SHARED MEMORY, AND SPECULATIVE GENERATION OF LOOKAHEAD FETCH REQUESTS

CROSS-REFERENCE TO RELATED APPLICATION

This invention relates to co-pending, commonly assigned U.S. patent application Ser. No. 09/047,139, filed Mar. 24, 1998, now U.S. Pat. No. 6,038,630, entitled "Shared Access Control Device For Integrated System With Multiple Functional Units Accessing External Structures Over Multiple Data Buses," the entirety of which is hereby incorporated herein by reference.

TECHNICAL FIELD

Generally stated, this invention relates to data request handling and processing within an integrated system, and more particularly, to a memory interface for a functional unit thereof which allows the functional unit simultaneous access to dedicated memory and shared memory, and which provides speculative generation of lookahead fetch requests for enhanced processing using the dedicated memory.

BACKGROUND OF THE INVENTION

Multiple functions are today commonly being integrated onto a single system chip. When initially defining architecture for integration of multiple discrete components onto a single chip, access to external devices can be a critical issue. For example, an MPEG video decoder system often employs external memory for various data areas, or buffers such as frame buffers. This external memory is typically implemented using either DRAM or SDRAM technology. In the decoder system, a video decode unit requires immediate access to external memory when needed to prevent starving the video display or on-screen graphics. If the video decoder's request for data is delayed, the picture could be corrupted. Likewise, an on-chip processor, if held from accessing external memory when needed could experience significant performance degradation.

Two approaches are typical in the art for accessing off-chip devices. In a first approach, each on-chip functional unit is given access to the needed external device(s) through a data bus dedicated to that particular unit. Although locally efficient for accessing the external device, globally within the integrated system this approach can be less than optimal. For example, although each function will have complete access to its own external memory area, there is no shared access between functions of the integrated system. Thus, transferring data from one memory area to another memory area of the system is often needed. This obviously increases data transfers and can thus degrade performance of the overall system, i.e., compared with a shared memory system. Also, when implementing strictly dedicated memory, the total memory size required may result in a non-standard memory increment that will have a cost premium attached. For instance, today's standard increments are in multiples of 8 megabytes. Therefore, to implement dedicated memory requiring 9 megabytes using standard increments would require two 8 Mbyte dedicated memories, totalling 16 megabytes.

Another approach is to employ a shared or common bus within the integrated system which allows one or more functional units of the system to communicate with external memory through a single port. Although allowing the sharing of memory, the difficulty with this approach arises when many functions are integrated onto a single chip, with each function requiring a certain amount of bandwidth for accessing data in shared memory. In implementation, the bandwidth of the single data bus needs to be sufficient to accommodate all functional units communicating through the bus. This bandwidth requirement can become prohibitive.

For example, in a video decode system, a video decode unit may require 100 Mbytes/sec of bandwidth, while a transport unit may require up to 5 Mbytes/sec of bandwidth, a processor unit up to 50 Mbytes/sec and an audio decoder up to 5 Mbytes/sec. Thus, with a single data bus serving these functional units, 160 Mbytes/sec of bandwidth would be needed. Further, in this example, each functional unit may be required to possess a large amount of internal buffering to span the time gap between memory accesses resulting from having multiple bandwidths sharing communications through the single bus. These bandwidth and buffer requirements associated with a shared bus implementation make a strictly shared bus/port implementation less than ideal for today's ever more integrated technologies. However, the use of shared memory does advantageously allow multiple functions to move data into and out of a common space efficiently, and since memory is shared with other applications, larger memory increments or granularity are possible, thereby allowing the use of standard or commodity components.

Therefore, there exists a need in the art for a memory interface for a functional unit of an integrated system which allows the functional unit to simultaneously access both dedicated memory and shared memory through multiple ports while avoiding the performance degradation and increased costs inherent in a solely dedicated approach to external memory. In one aspect, the present invention is directed to meeting this need.

DISCLOSURE OF THE INVENTION

Briefly described, the present invention comprises in one aspect a memory interface for a functional unit of an integrated system. The memory interface includes multiple memory ports, at least one memory port being coupled to dedicated memory and at least one memory port being coupled to shared memory. The dedicated memory comprises private memory for the functional unit and the shared memory comprises common memory coupled to the functional unit and at least one additional functional unit of the integrated system. The memory interface further includes a receiver for receiving memory fetch requests from at least one requesting unit within the functional unit and a controller for controlling forwarding of each memory fetch request to either the dedicated memory or the shared memory.

In another aspect, the invention encompasses an integrated system which is coupled to dedicated memory and shared memory. The integrated system includes a shared system data bus and multiple functional units coupled to the shared system data bus for sending requests thereon to access the shared memory. One functional unit of the multiple functional units includes a memory interface. The memory interface has multiple memory ports, with one memory port being coupled to the shared system data bus, and one memory port coupled to the dedicated memory for sending requests thereto. The dedicated memory comprises private memory for the one functional unit containing the memory interface.

In a further aspect, the invention includes a memory interface for a functional unit of an integrated circuit. This memory interface includes at least one memory port coupled to dedicated memory, which comprises private memory for the functional unit. A receiver is provided for receiving memory fetch requests from at least one requesting unit within the functional unit. Additionally, a lookahead request generator is provided for generating lookahead fetch requests within the memory interface using information from the received memory fetch request, and known memory access patterns. A controller is provided for forwarding each memory fetch request and each lookahead fetch request to the dedicated memory. The controller forwards the fetch requests so as to optimize bandwidth on a channel coupling the at least one memory port and the dedicated memory.

In a yet further aspect, the invention comprises an integrated system coupled to dedicated memory. The integrated system includes a functional unit connected to the dedicated memory across a memory interface. The memory interface includes at least one memory port coupled to the dedicated memory so that the dedicated memory comprises private memory to the functional unit. The memory interface further includes a receiver and a lookahead request generator. The receiver receives memory fetch requests from at least one requesting unit of the functional unit, and the lookahead request generator generates lookahead fetch requests using information from the received memory fetch request and using known memory access patterns of the functional unit. A controller is provided for optimally forwarding the memory fetch requests and the lookahead fetch requests to the dedicated memory.

In a still further aspect, a method is provided for handling external memory fetch requests within a functional unit of an integrated system. The functional unit is coupled to dedicated memory and to shared memory across multiple memory ports of a memory interface. The method includes: receiving a memory fetch request from at least one requesting unit of the functional unit; determining whether to forward the memory fetch request to the dedicated memory or to the shared memory, the determination being transparent to the at least one requesting unit; and forwarding the memory fetch request to the dedicated memory or the shared memory. This forwarding of each memory fetch request to either dedicated memory or shared memory is preferably transparent to the requesting unit.

In a yet further aspect, a method is provided for handling memory fetch requests of a functional unit within an integrated system. The functional unit is coupled to dedicated memory through at least one memory port. The method includes: receiving memory fetch requests from at least one requesting unit of the functional unit; generating lookahead fetch requests for speculatively retrieving information from the dedicated memory using information on the received memory fetch requests and known memory access patterns of the functional unit; and controlling forwarding of each memory fetch request and lookahead fetch request to the dedicated memory for optimum bandwidth utilization on a channel coupling the at least one memory port and the dedicated memory.

To restate, provided herein is a memory interface and memory request handling method which allow the requesting units of a functional unit in an integrated circuit access to different memory types through two or more memory ports. One memory port is coupled to dedicated memory, while another port is coupled to shared memory across a general system bus. The dedicated memory port has a specialized controller that is optimized for continuous burst operations and is sized to work in increments of commodity memory, while a generalized memory controller is coupled across the standard system interface, and allows shared access by other functions of the integrated circuit. The generalized memory controller is optimized for more random read/writes. The placement of specific decoder buffers in one port or the other (and the relative placement of each buffer in the respective memory space) is based on initialization parameters. During operation, the memory interface directs accesses to the appropriate memory port based on logical addressing of the requests.

The dedicated memory port is efficient for MPEG-specific functions, such as motion compensation read and writes, while the shared memory port is designed with short latency to support, for example, a host controller access, and compressed data and on-screen display read and writes. For a given application, the private memory pool is allocated first, taking advantage of the high performance memory as long as the buffers fit within cost effective granularity (e.g., 8 Mbytes). Buffers that exceed the dedicated memory pool can be placed in shared memory. Generally, data that requires access by the host controller, such as compressed data and on-screen display data, is also placed in shared memory for efficient transfer. The result is a generalized design that allows the flexibility and scalability of a shared memory pool while still providing the performance optimization and cost advantages of dedicated memory using commodity memory increments.

Further, there are differences in the access patterns of video decoders versus general purpose cached processors that are taken advantage of pursuant to the present invention. A general purpose cached processor will generate a stream of relatively random accesses in which a short latency is important since the data is unavailable in cache and is being requested by the processor, which is typically stalled until the data is available. In contrast, the video decoder pipelines are very sensitive to overall bandwidth available since there must be sufficient bandwidth to meet the real-time demands of decoding within a frame-time but the actual latency is less important. Also, the access patterns of video decoders are relatively well-known since the processors will work on a block-by-block basis.

Thus, the dedicated memory controller and shared memory controller employed in the present invention are preferably optimized for different access characteristics. The dedicated memory controller, which is optimized for a maximum bandwidth, is preferably tuned (for example) to the specific decode function application, and optimizes the accesses to the specific physical memory. The shared memory controller must deal with a wider range of applications and memory access patterns, and is therefore more general purpose. By optimizing the controllers for the type of job that is accomplished, overall performance of the memory subsystem is enhanced, while design complexity is managed with minimized cell count and power utilization.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Figure 1:
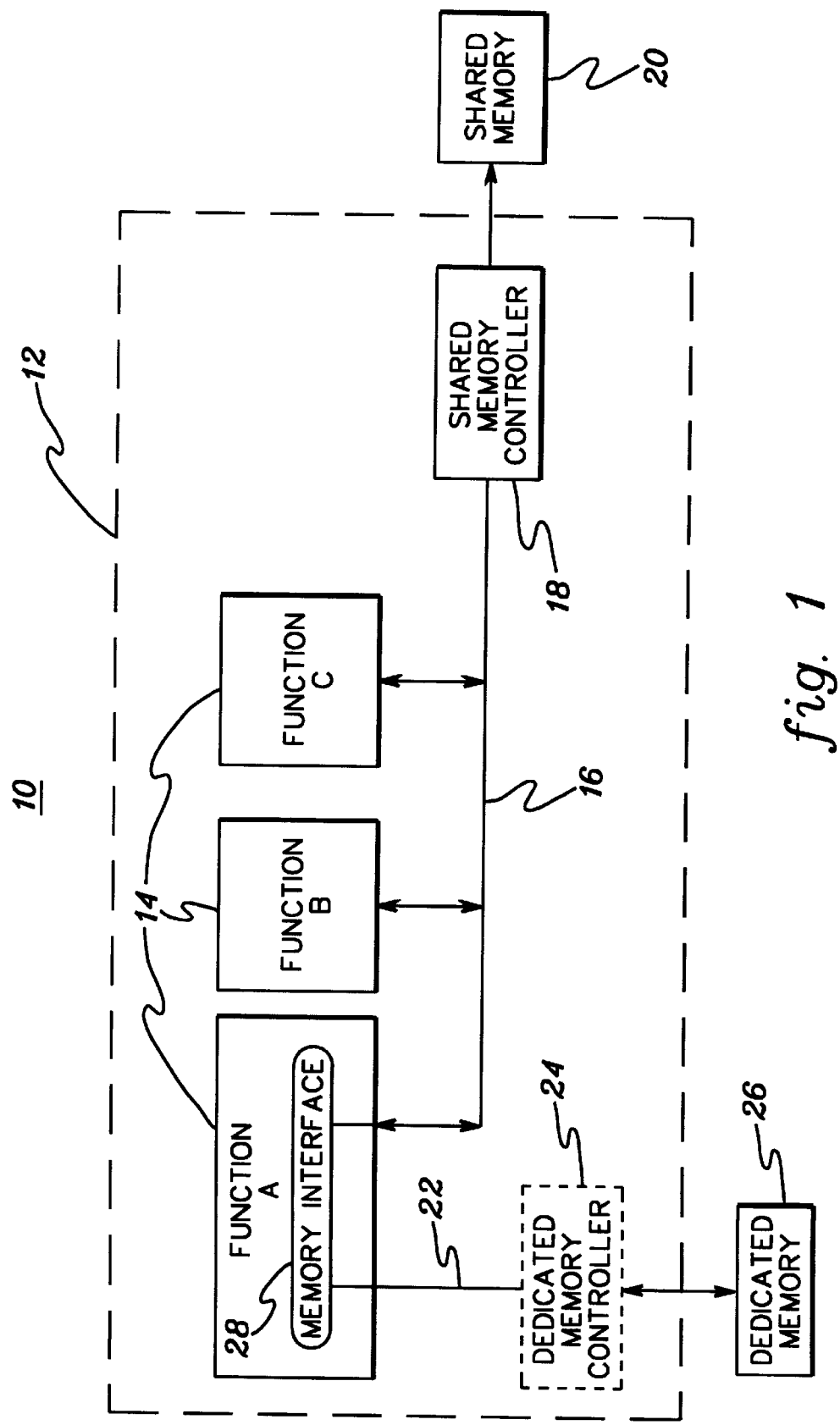
FIG. 1 depicts one embodiment of an integrated system architecture in accordance with the present invention wherein functional unit A includes multiple memory ports which couple to dedicated memory and shared memory.
Figure 2:
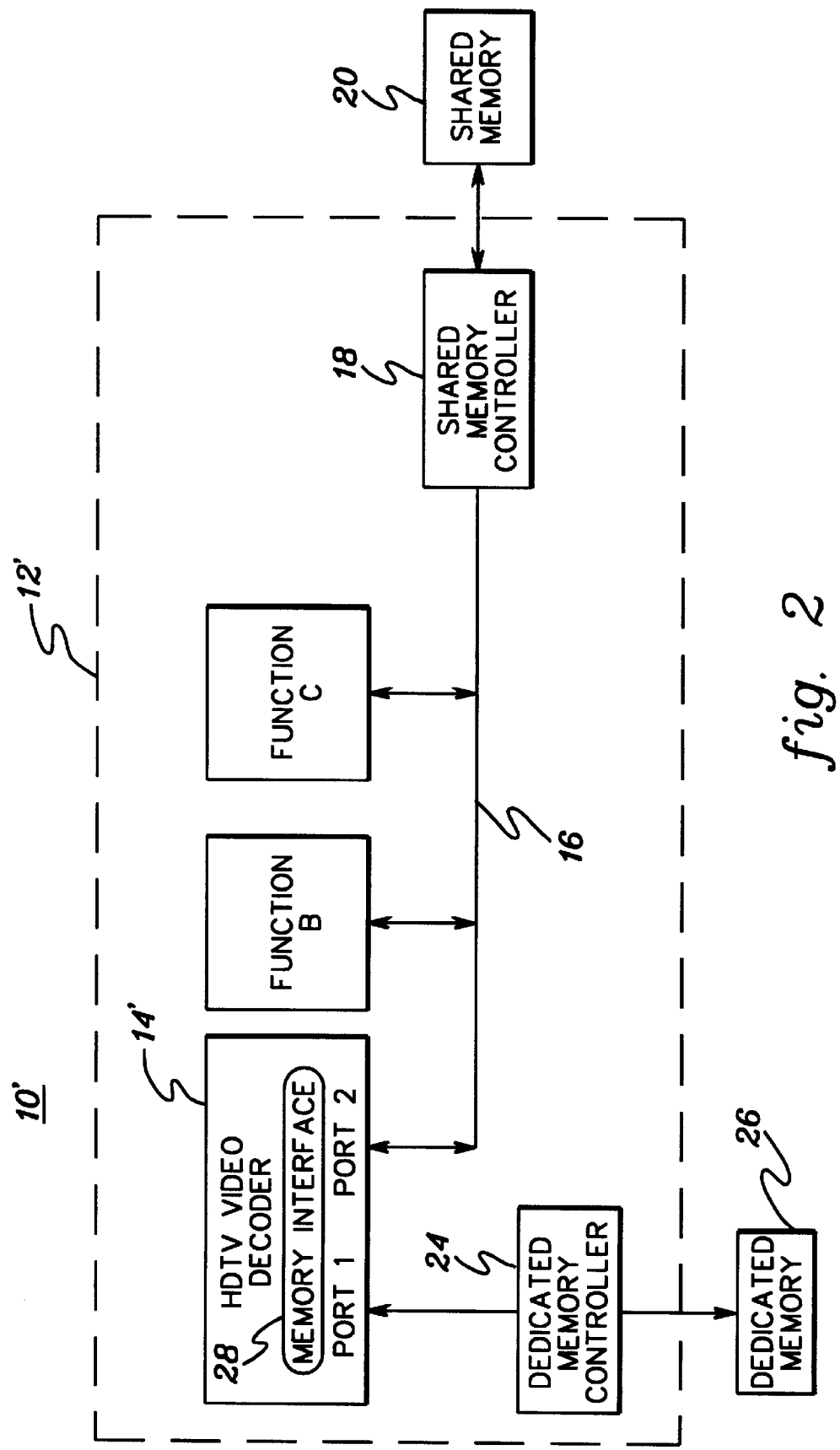
FIG. 2 depicts a further embodiment of an integrated system pursuant to the present invention wherein functional unit A is shown to comprise an HDTV video decoder.
Figure 3:
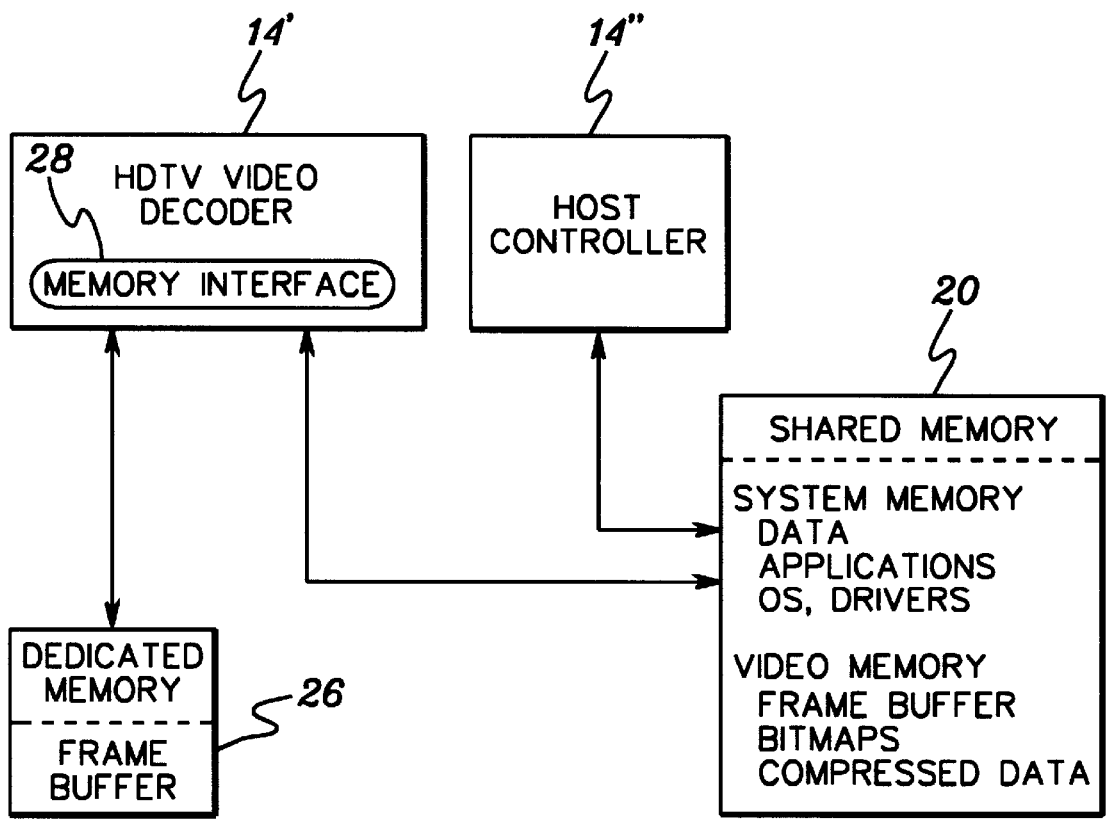
FIG. 3 is an operational block diagram showing memory data paths employed, for example, in the integrated system of FIG. 2.

Generally stated, this invention is targeted to integrated systems having several functions on a single chip wherein the functions access multiple memories. Conventionally, the multiple memories comprise off-chip memories, however, one or more of the memories described herein may alternatively comprise on-chip memory space. Pursuant to one aspect of the present invention, a functional unit is provided with multiple memory ports, each memory port coupling to a different type of memory. For example, one port couples via a dedicated bus to dedicated memory, while another port couples via a general system bus to shared memory. In another aspect, this invention comprises a lookahead request generator implemented within a memory interface of a functional unit. The lookahead request generator intelligently generates speculative memory requests based on actual memory requests received from the requesting units and based on predefined information, such as known memory request patterns. Further, this invention preferably employs an automated reordering of memory requests at a request dispatcher in order to optimize bandwidth on the communications link coupling the memory interface to dedicated memory, as well as the internal memory banks of the dedicated memory. FIGS. 1–3 depict examples of the multi-port aspect, while FIGS. 4–7 depict the lookahead request generator and reordering concepts of the present invention.

In FIG. 1, an integrated system architecture, generally denoted 10, includes an integrated circuit chip 12, having multiple functional units 14 which read/write access a shared memory 20 and a dedicated memory 26 as shown. As used herein, a "functional unit" is anything that can act as a master and request a read or write cycle from a slave device, such as memory. Requests from functional units B & C are fed through a general system bus 16 to a shared memory controller 18 and hence to shared memory 20.

Significant to this invention is the presentation of functional unit A with multiple memory ports. A first memory port is coupled to the general system bus 16, while (in this example) a second memory port connects to a dedicated bus 22 coupled to dedicated memory 26 directly through a dedicated memory controller 24 (shown in phantom) which can be external or internal to functional unit A. Memory requests are directed by a memory interface 28 in accordance with this invention to either the first memory port or the second memory port. Preferably, this forwarding of memory requests is transparent to the requesting unit within functional unit A, i.e., memory interface 28 preferably presents the appearance of a unified memory space to the requesting units within functional unit A.

Note that FIGS. 1 & 2 depict dual memory ports by way of example. A functional unit in accordance with the present invention may alternatively be connected to three or more memories. For example, a third memory port might couple functional unit A to a second dedicated memory (not shown). Additionally, those skilled in the art should note that shared memory 20 and dedicated memory 26 could alternatively reside within integrated circuit chip 12. Further, the depicted data buses in practice may each comprise an associated read data bus and write data bus.

An example of an integrated system architecture 10' in accordance with the present invention for a high definition digital video decoder is depicted in FIG. 2. In this architecture, an integrated circuit chip 12' again includes multiple functional units B & C, with generic functional unit A shown to comprise a High Definition Television (HDTV) video decoder 14'. As understood by one skilled in the art, video decoder 14' will include a number of requesting units (not shown), including a variable length decoder, an inverse quantizer, and a motion compensation unit. In this example, the HDTV video decoder again includes two memory ports, with port 1 being coupled to dedicated bus 22 for accessing dedicated memory 26 through dedicated memory controller 24, and port 2 coupled to the general system bus 16 for accessing shared memory 20 through common memory controller 18. Advantageously, this FIG. 2 configuration/design allows functional unit 14' to concurrently access memory at the different memory ports 1 & 2. Thus, enhanced throughput with little or no latency/interference per cycle is attained. Further, this approach advantageously allows mixing of different memory technologies (and/or different types of external devices), which may assist in minimizing costs of the overall architecture and enhancing performance.

Again, memory interface 28 preferably presents the appearance of a common address space to the requesting units within functional unit 14' of the integrated system since all requests from the functional unit will be through this memory interface.

By way of further example, FIG. 3 depicts the operational data paths shown in FIGS. 1 & 2. In this figure, an HDTV video decoder 14' includes the memory interface 28 in accordance with the invention for accessing both dedicated memory 26 and shared memory 20. A host controller 14" also accesses shared memory 20, for example, through a shared general system bus. In one example, dedicated memory 26 may include frame buffers for the video decoder 14', while shared memory 20 might contain system memory data (including application programs, the operating system, and drivers), as well as video memory, such as overflow frame buffer space, bitmaps and compressed data. As noted above, the memory port connected to dedicated memory is optimized for continuous burst operations and is preferably sized to work in increments of commodity memory. The memory port going to the general memory controller across the standard system interface is preferably optimized for more random read/writes. The placement of particular video decode buffers in one port or the other (i.e., at the respective memory space coupled to the ports) is determined based on initialization parameters. During operation, the memory interface directs accesses to the appropriate memory port based on logical addressing contained within the memory fetch requests received from the requesting units.

As briefly noted above, for a given application, the dedicated memory pool is preferably allocated first, taking advantage of the high performance memory as long as the buffer fits within a cost effective granularity. Buffer space that exceeds the dedicated memory pool will then be placed into shared memory. Generally, data that requires access by the host controller (such as compressed data and on-screen display data) will initially be placed in shared memory for efficient transfer. As an example, an application that requires decoding of the highest format HDTV video (i.e., 1080 lines, interlaced), would use a full 8 Mbytes of private memory and approximately another 4–8 Mbytes of shared memory. Alternatively, an application requiring a medium format HDTV video (720 lines, progressive), may use a full 8 Mbytes of private memory, but only 2–4 Mbytes of shared memory. A low-end HDTV application may contain all of the decoding requirements within the private memory alone. Thus, a scalable HDTV decoder memory structure is presented which partitions the memory in a flexible manner for varying applications and allows for the most economical implementation with optimized performance that satisfies the system access and bandwidth requirements.

There are differences in the access patterns of video decoders versus general purpose cached processors which are taken advantage of in accordance with the present invention using a dedicated memory controller and the dedicated memory. A general purpose cached processor will generate a stream of relatively random accesses in which short latency is important since the data is unavailable in cache and is being requested by the processor. In comparison, video decoder pipelines are typically sensitive to overall bandwidth available since there must be sufficient bandwidth to meet real-time demands of decoding within a frame-time, but the actual latency is less significant. Also, the access patterns of video decoders are relatively known since the processors work on a block-by-block or macroblock-by-macroblock basis. The dedicated memory is preferably optimized for maximum bandwidth by employing a large queue of multiple memory requests from several decoder pipelines within the video decoder. These requests are selected potentially out of order by a reordering request dispatcher 50 (FIG. 4) to hide access latency of the multiple banks in the physical DRAM. Since access patterns are relatively known, the memory interface can also anticipate an address and generate a lookahead fetch request to fill a memory access slot that would normally not have been used. These enhancements to the dedicated memory port will tend to increase a single request access latency, but overall will improve total available bandwidth.

Figure 4:
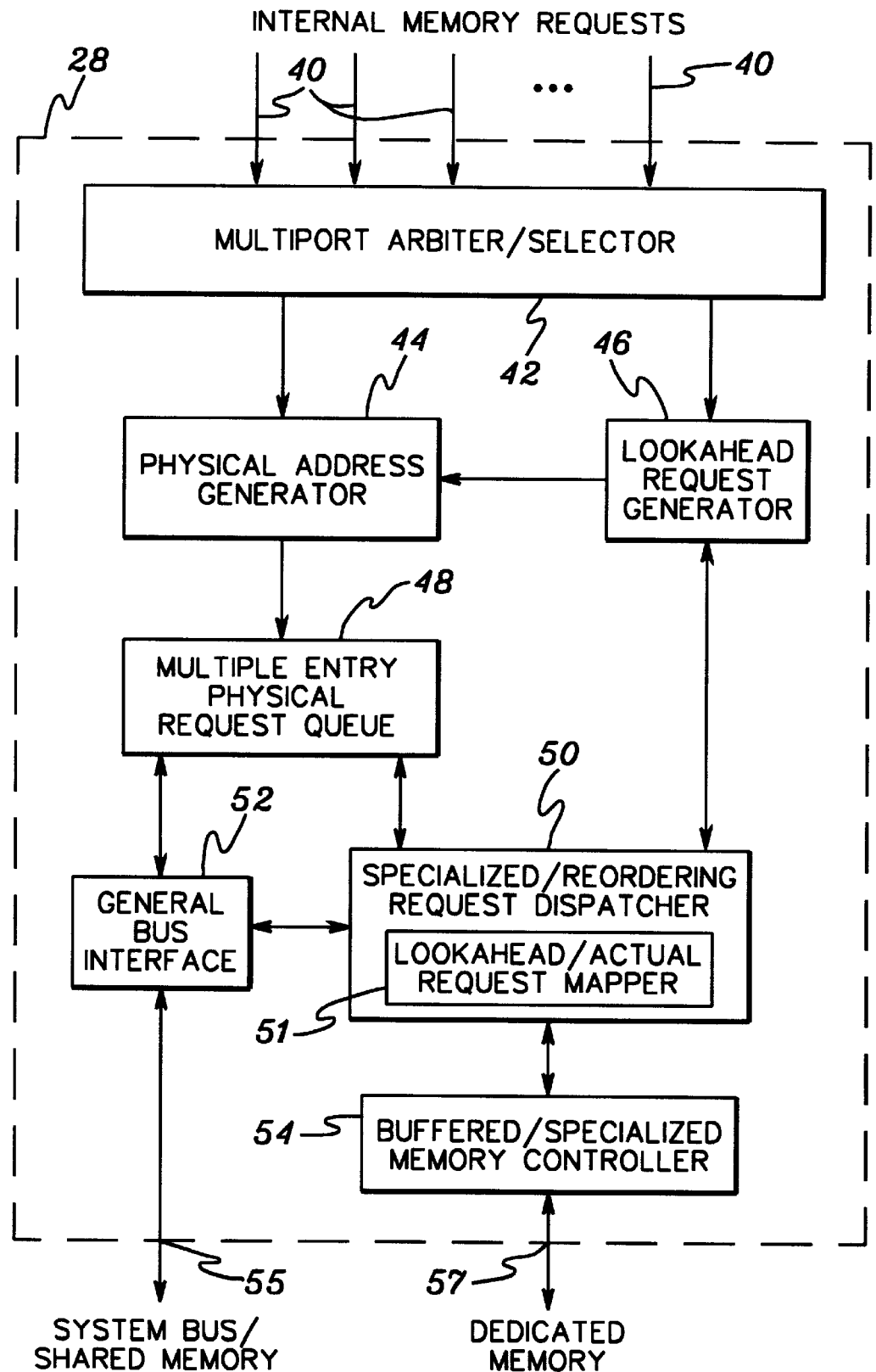
FIG. 4 depicts one embodiment of a memory interface in accordance with the principles of the present invention.

One embodiment of a memory interface incorporating the above-noted aspects of the present invention is shown in FIG. 4. This memory interface 28 receives request signals on multiple buses 40 from requesting units (not shown) within the associated functional unit of the integrated system. These memory fetch requests are initially received at a multi-port arbiter/selector 42 which prioritizes each request when multiple requests are concurrently received. Each selected request is forwarded to a physical address generator 44 where the logical address associated with the request is converted to a physical address for accessing memory space in one of the memories coupled to the memory interface.

Additionally, selected identifying information from each fetch request is forwarded from multi-port arbiter/selector 42 to a lookahead request generator 46 in accordance with this invention. Generator 46 looks at the received fetch request information and generates therefrom speculative or lookahead fetch requests designed to enhance performance of the memory subsystem. The lookahead requests generated by generator 46 are directed to memory space within the dedicated memory.

Both the actual requests, forwarded by arbiter/selector 42, as well as the lookahead requests, forwarded by generator 46, are converted from logical addresses to physical address requests within physical address generator 44. The physical address requests are then pooled logically in multiple queues, (each queue corresponding to one memory port) in a multi-entry physical request queue 48. For example, a first queue might be reserved for physical address requests to be transferred to shared memory via a general bus interface 52, while a second queue is reserved for physical address requests to be forwarded to dedicated memory.

The dedicated memory requests are preferably sent through a specialized/reordering request dispatcher 50 in accordance with this invention. Dispatcher 50 includes a lookahead/actual request mapper 51 where actual requests are mapped to previously generated speculative or lookahead requests to ensure that an actual request is not dispatched which may already have been executed as a lookahead request. In accordance with this invention, reordering occurs at request dispatcher 50 so as to optimize bandwidth on the dedicated memory bus coupled between the corresponding memory port and dedicated memory.

Requests are forwarded from request dispatcher 50 to a buffered/specialized memory controller 54 also constructed in accordance with this invention. Preferably, specialized memory controller 54 is a multi-bank memory controller with feedback for performance tracking to the request dispatcher and the lookahead request generator 46. Specialized memory controller 54 is coupled through a dedicated memory port 57 to dedicated memory, which may include, for example, synchronous dynamic random access memory (SDRAM) or other high performance DRAM memory which exceeds the bandwidth of regular DRAM and has a multi-bank architecture. Bus interface 52 couples through a memory port 55 to a general system bus. As shown in FIGS. 1 & 2, the general system bus can couple to shared memory through a common memory controller. Alternatively, a shared access control device can be used, such as described in the above-incorporated United States Patent Application by Foster et al., entitled "Shared Access Control Device For Integrated System With Multiple Functional Units Accessing External Structures Over Multiple Data Buses."

Figure 5:
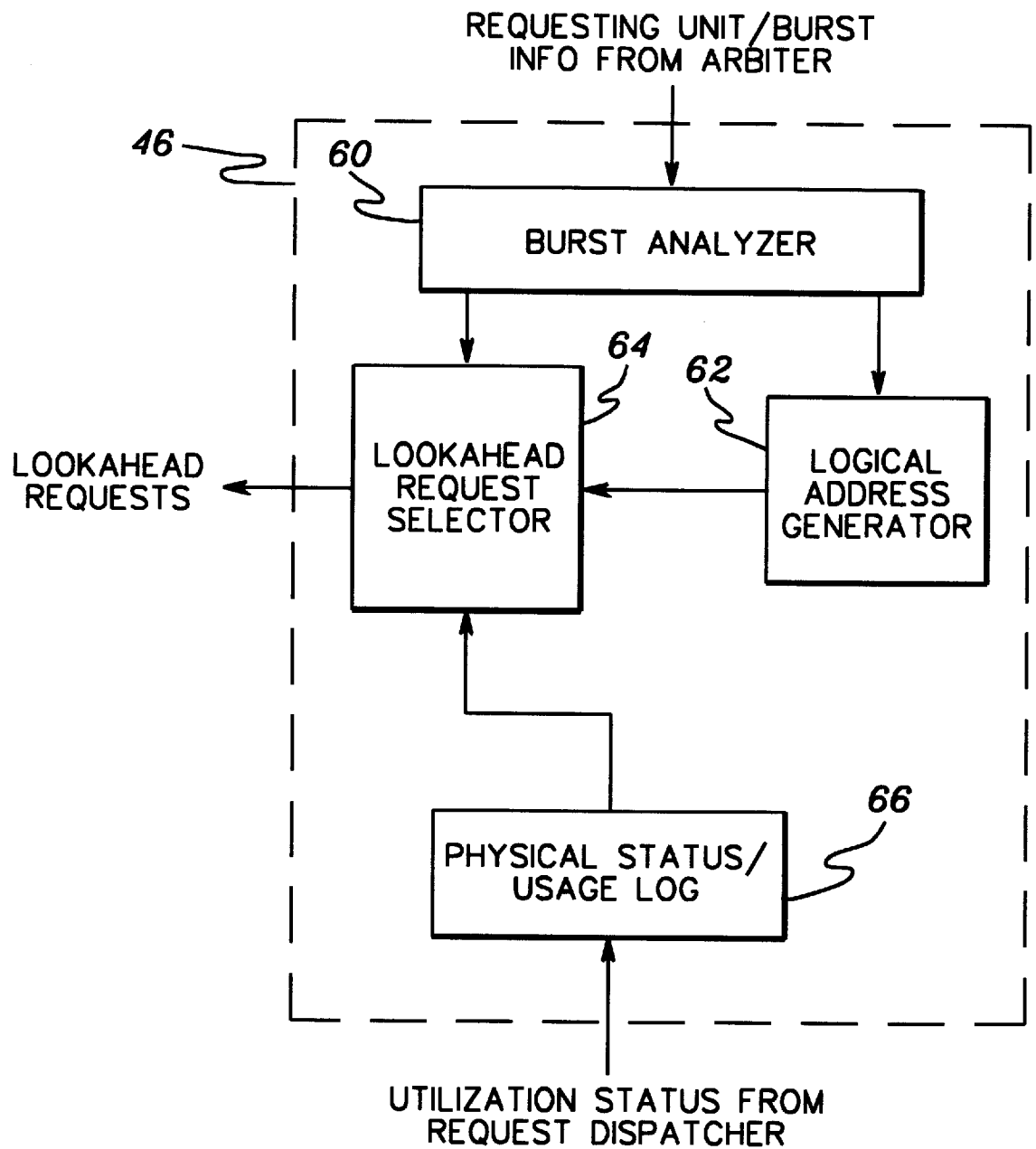
FIG. 5 depicts one embodiment of the lookahead request generator 46 of FIG. 4, in accordance with the present invention.
Figure 6:
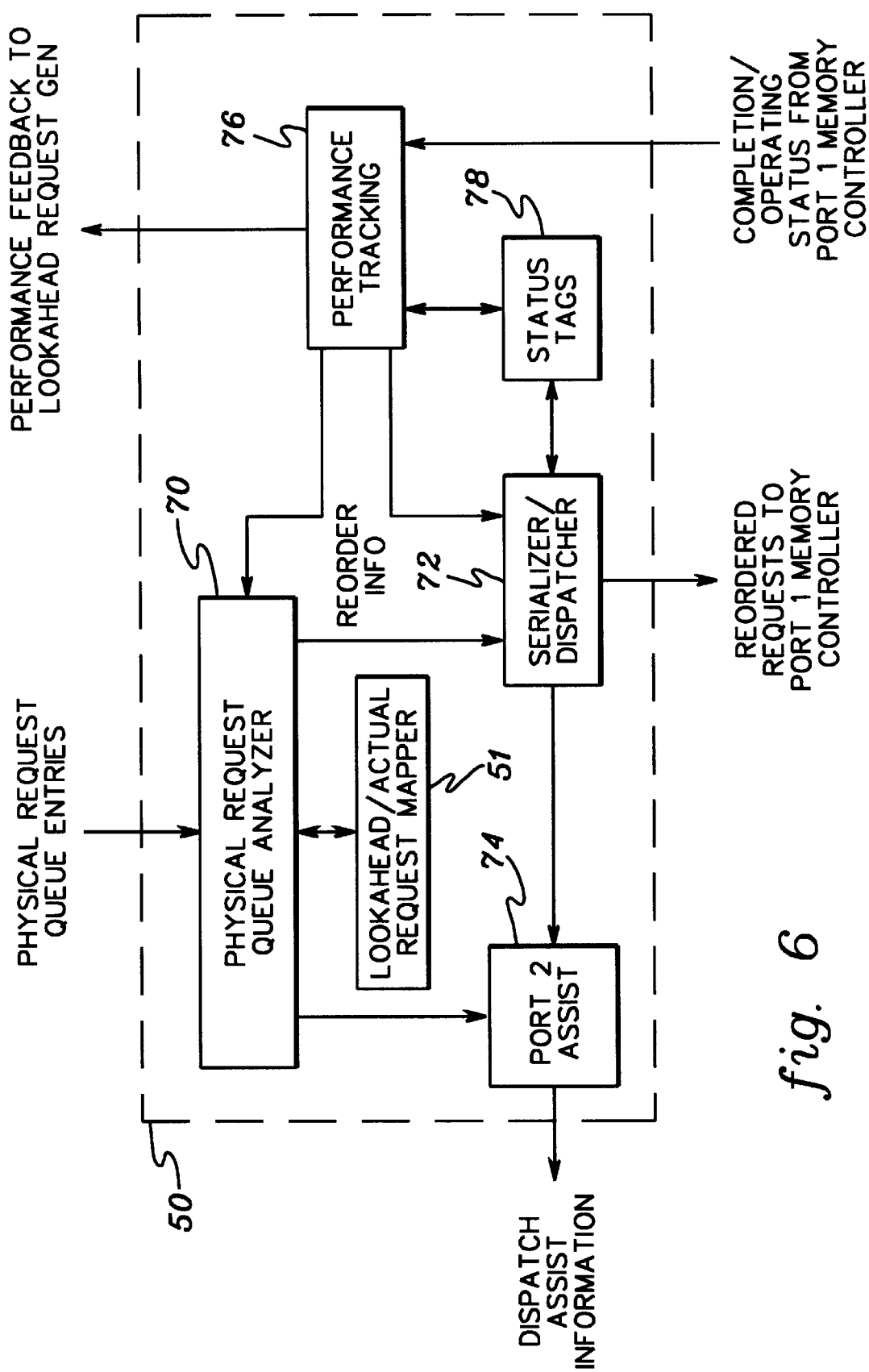
FIG. 6 depicts one example of the specialized/reordering request dispatcher 50 of FIG. 4, in accordance with the present invention.
Figure 7:
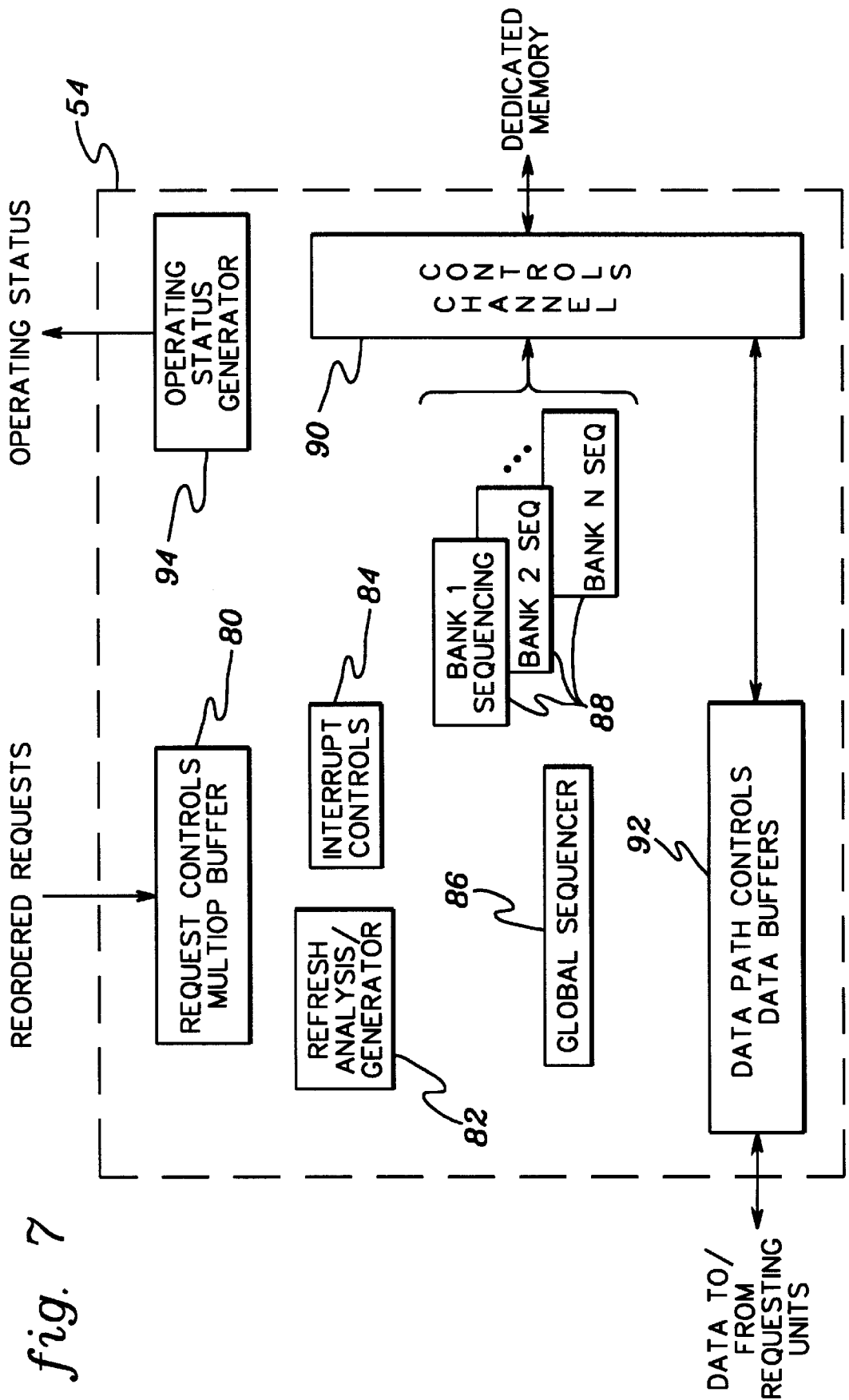
FIG. 7 depicts one embodiment of the buffered/specialized memory controller 54 of FIG. 4, in accordance with the present invention.

By way of further detail, FIGS. 5, 6 & 7 depict (in accordance with this invention) embodiments of a lookahead request generator 46, a specialized/reordering request dispatcher 50, and a buffered/specialized memory controller 54, respectively.

Referring to FIG. 5, the lookahead request generator 46 receives requesting unit/burst information from arbiter/selector 42 (FIG. 4). This information comprises identifying information, for example, on the requesting unit, the size of the request, as well as the logical address. The requesting unit in a video decoder implementation might comprise a motion compensation unit, a display unit, an I/O unit or an audio unit. A burst analyzer 60 analyzes the access patterns of the actual requests. This analysis is then used to generate speculative lookahead requests via a logical address generator 62. These lookahead requests are used to reduce the latency of future requests by pre-fetching data and holding the data in a buffer until the actual request is received. Additionally, the lookahead requests can be used to fill data transfer slots to maintain bandwidth on the bus to/from dedicated memory. Conventionally, external memory requests are bursty. Each set of requests has an expected count/series of requests as well as a reasonably predictable addressing pattern. The addressing pattern and timing is analyzed by the burst analyzer 60 and information is passed to the logical address generator 62 to calculate logical addresses. The lookahead request selector 64 determines which lookahead request to actually send for conversion to physical addresses and place in the physical request queue 48 (FIG. 4). Those skilled in the art will recognize that this selection can be based on a predefined algorithm as well as feedback information received from the request dispatcher 50 (FIG. 4), e.g., as a physical status/usage log 66.

The lookahead request selector 64 essentially decides whether to use a generated logical address. For example, if multiple lookahead addresses are generated, and there is room in the request queue for only one lookahead request, then the lookahead request selector may select the request with the highest probability of an associated actual request. Further, if the number of actual requests into the physical address generator is high, there may be little room for the generated lookahead requests. Conversely, if the request queue is quiet, then the lookahead request selector may feed several speculative requests into the system. This aspect of the invention works because the memory requests are bursty by nature in, for example, a video decoder. Essentially, this invention is attempting to pre-fetch data that will ultimately be needed based upon known fetch request patterns.

For example, a motion compensation unit may be generating requests for a block of data it is processing. This processing typically generates a series of eight requests with each address separated by a fixed value. After the eight requests, a fairly lengthy delay occurs to the next series of requests. The individual requests have a high regular access pattern that is predictable and this predictability can be used to generate future addresses. Also, the address of the next series of requests is fairly regular and may be used for a lookahead access.

Based on utilization of the memory controller, the lookahead request generator will analyze these access patterns and generate requests that anticipate the addressing of the next burst series and have the data waiting in data buffers to minimize the latency for those accesses as well as utilize bandwidth (transfer slots) that would normally not be available.

The specialized/reordering request dispatcher 50 of FIG. 6 receives physical request queue entries in a physical request queue analyzer 70. Queue analyzer 70 preferably performs request reordering in accordance with this invention and outputs reordered information to a serializer/dispatcher 72. The reordered requests are transferred to the dedicated memory controller port. Additionally, selected information may be optionally output as a port 2 assist 74 for use by the general purpose memory bus to improve performance of the common memory controller. Status tags 78 are also generated and performance tracking 76 occurs for feedback to lookahead request generator 46 (FIG. 5). Performance tracking 76 also preferably receives completion/operating status information from the dedicated memory controller.

To generalize, the request dispatcher analyzes each physical address request from the request queue and attempts to maximize the bandwidth utilization of the dedicated memory controller by supplying a series of requests that the dedicated memory controller can overlap. The request dispatcher 72 has both actual and lookahead fetch requests available and dynamically chooses an optimum mix to dispatch. Information is utilized from the memory controller by performance tracking 76 to optimize the dispatch as well as feedback information to the lookahead request generator to alter future lookahead operations. The actual serializer/dispatcher unit keeps track of the situation with status tags linked to the in-operation request.

By way of example, a characteristic of physical memory chips is that sequential accesses to the same memory bank are slower than sequential accesses to alternate banks. This is a physical characteristic of the memory storage mechanism of a multi-bank implementation used in current and future generation memory chips. Given a memory chip with two banks (each bank 512 bytes) the request dispatcher reorders the requests so that each operation goes to the opposite bank, thus fully utilizing the data transfer channel and maximizing the bandwidth available. For example, assume the following access pattern (utilizing an increment of 720):

TABLE I

| Accesses as Received | | |
|---|---|---|
| Address | Bank | Access |
| 0 | 0 | A |
| 720 | 1 | B |
| 1440 | 0 | C |
| 2160 | 0 | D |
| 2880 | 1 | E |
| 3600 | 1 | F |
| 4320 | 0 | G |
| 5040 | 1 | H |
| 5760 | 1 | I |
| 6480 | 0 | J |

When done in sequential order, a gap will occur when a bank 0 is followed by a bank 0 access or when a bank 1 access is followed by a bank 1 access. In accordance with this invention, the request dispatcher (having access to multiple requests from the multiple entry physical request queue) will dispatch the above requests out of sequence, thus better utilizing the data transfer channel by overlapping each access. The result is depicted in Table II.

TABLE II

| Accesses as Dispatched | | |
|---|---|---|
| Address | Bank | Access |
| 0 | 0 | A |
| 720 | 1 | B |
| 1440 | 0 | C |
| 2880 | 1 | E |
| 2160 | 0 | D |
| 3600 | 1 | F |
| 4320 | 0 | G |
| 5040 | 1 | H |
| 6480 | 0 | J |
| 5760 | 1 | I |

The out-of-order memory accesses are executed and buffered by the buffered/specialized memory controller. Future memory chips may utilize additional memory banks, however, the same concept applies as in the dual bank example provided above.

FIG. 7 depicts one embodiment of a buffered/specialized memory controller 54 in accordance with this invention.

This specialized memory controller receives reordered requests from the request dispatcher in a local request buffer 80. A refresh analysis generator 82 is counting to determine when a memory refresh operation is to occur. Interrupt controls 84 comprise a task switch controller working with a global sequencer 86 to feed requests into bank sequencing logic 88. Each bank sequencing 88 operates as an independent task, feeding data out to or receiving data from the requesting unit or the data buffer 92. N sequencing banks are shown wherein N might today comprise a number between 2 and 16. A multiplexer or channel controller 90 couples output of each bank sequencer to the dedicated memory channel.

To restate, the memory controller 54 accepts transfer requests from the request dispatcher and executes them, maintaining sequencing control of each bank. The memory controller is specialized in that information is maintained regarding whether the transfer is an actual or speculative (lookahead) request and data is either transferred to the unit that has requested it or is held in special data buffers 92 until needed. Preferably, lookahead transfers may be interrupted with no transfer penalty to service an actual transfer. The state of the dedicated memory is optimally managed based on the transfers in progress as well as information on the next transfers to be performed. Operating status is returned via a generator 94 to the request dispatcher (FIG. 6) to assist in the dispatch operation. Data path controls and buffers 92 comprise the read/write data paths and accompanying buffers in accordance with this invention to hold lookahead requested data. Buffers 92 provide the requested information to the actual requesting units.

Figure 8:
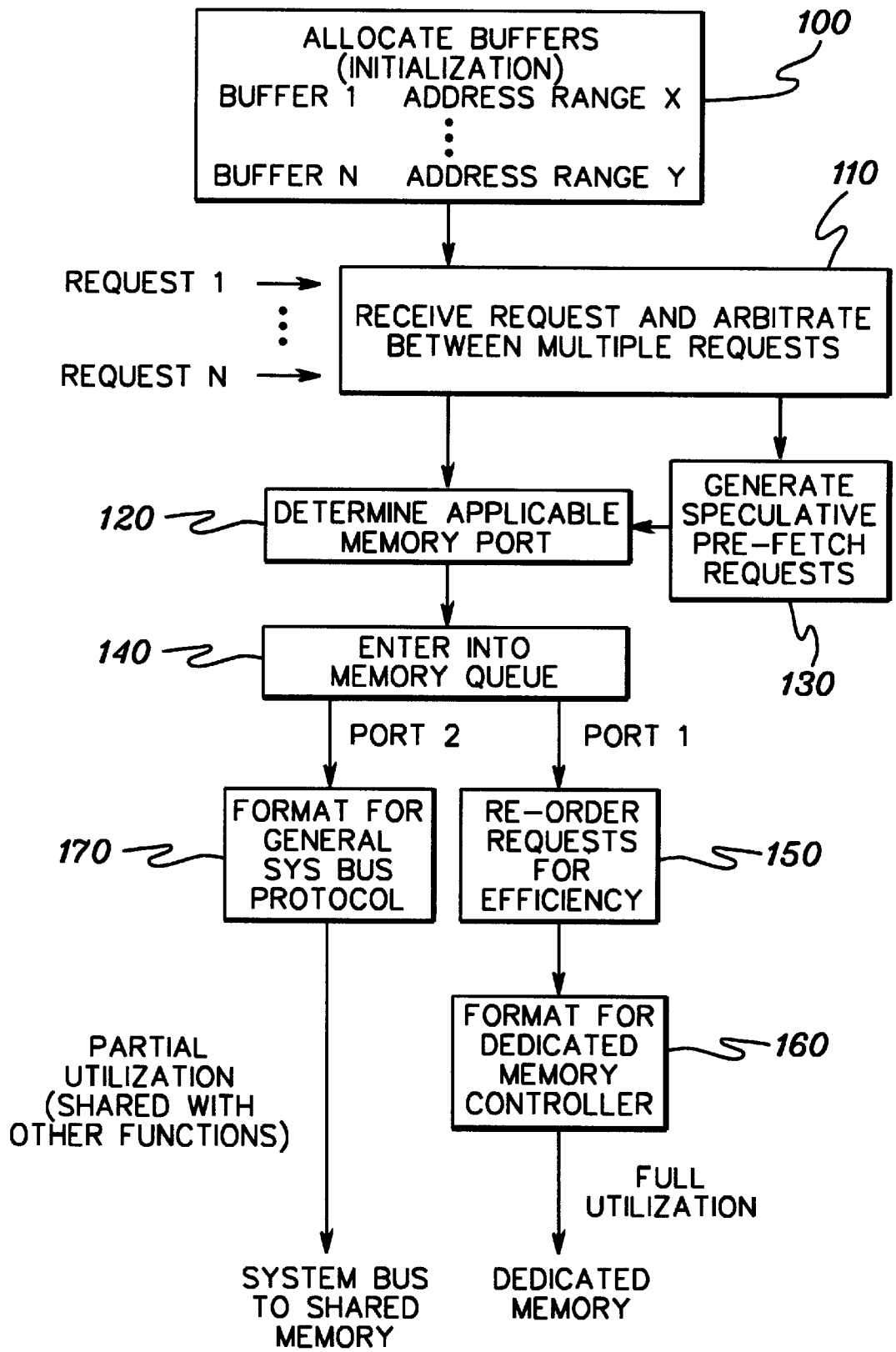
FIG. 8 is a flowchart of a memory access processing embodiment in accordance with the present invention.

FIG. 8 depicts an operational overview of the present invention. As shown, buffers are initially allocated with predefined address ranges 100. By way of example, buffers 1 through M might be located in dedicated memory, while buffers M+1 through N might be located in shared memory at setup. After initialization, requests are received and arbitrated 110 in order to establish priority. Various arbitration schemes could be employed for this purpose. For example, a conventional round-robin technique might be used when more than one request is received at any point in time.

Each fetch request is mapped to the appropriate physical memory 120 according to the buffer allocation performed at initialization. Commensurate with this, speculative lookahead requests are generated 130 in accordance with the present invention in part from identifying information from the actual requests received. After determining the applicable memory port 120, the physical requests are placed into an appropriate memory queue 140. Each memory port 1 & 2 (for example) contains an associated physical address request queue. Requests to dedicated memory preferably undergo further reordering to enhance efficiency 150 as described above, and are then formatted for the dedicated memory controller 160 before being forwarded to dedicated memory. Physical requests queued to port 2 are formatted for general system bus protocol 170 before being output on the general system bus to shared memory.

Note that a high definition television (HDTV) decoder as described herein represents only one embodiment of the present invention. The multi-ported memory interface disclosed can be extended to any application that would benefit from the ability to concurrently use two (or more) memory ports which are optimized for different access characteristics. One port provides connection to a general system bus and subsequent connect to system memory, thus allowing shared access, and the other port is optimized for predictable memory accesses of a given function, and is directly connected to dedicated memory.

In this case, the multi-ported memory interface can be described more generically as consisting of a means of sorting requests into their respective memory regions (ports) based on a predetermined buffer allocation, and intelligently manipulating the requests based on known memory access patterns for the function as well as the characteristics of the memory ports. For shared memory, the data requests must be compliant with the established system bus protocol, and are optimized for short bursts to avoid dominating the bus (and preventing other devices from accessing memory). For dedicated memory, data requests can be re-ordered or even pre-fetched on speculation, and must be optimized for long bursts in alternating banks to fully utilize all available access time and minimize overhead.

Also, note that the present invention can be further applied to designs with embedded logic functions and memory cells (DRAM) in the same physical module or chip. As an example, the dedicated memory described herein could comprise a 2 Mbyte high performance, on-chip memory, and the shared memory might comprise traditional external DRAM components.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A memory interface for a functional unit of an integrated system, said memory interface comprising:

multiple memory ports, at least one memory port being coupled to a dedicated memory and at least one memory port being coupled to a shared memory, said dedicated memory comprising a private memory for said functional unit and said shared memory comprising a common memory coupled to said functional unit and at least one additional functional unit of said integrated system;

a receiver for receiving memory fetch requests from at least one requesting unit of said functional unit;

means for controlling forwarding each of a plurality memory fetch requests to one of said at least one memory port coupled to said dedicated memory or said at least one memory port coupled to said shared memory; and wherein a plurality of requests of said memory fetch requests will access said dedicated memory, and wherein said memory interface further comprises means for optimizing ordering of said plurality of requests to access said dedicated memory to improve efficiency of memory access, and means for formatting each memory fetch request of said plurality of memory fetch requests for a dedicated memory controller associated with said at least one port of said memory interface coupled to said dedicated memory.

2. The memory interface of claim 1, wherein said means for controlling comprises means for forwarding each memory fetch request to either said dedicated memory or said shared memory transparent to said at least one requesting unit.

3. The memory interface of claim 2, wherein each memory fetch request comprises a logical address, and wherein said means for forwarding comprises means for converting said logical address of each memory fetch request to a physical address for accessing one of said dedicated memory or said shared memory.

4. The memory interface of claim 1, wherein at least one memory fetch request will access said shared memory, and wherein said memory interface further comprises means for formatting said at least one memory fetch request for forwarding to said shared memory using general system bus protocol.

5. The memory interface of claim 1, wherein said memory interface further comprises means for arbitrating between said memory fetch requests.

6. A memory interface for a functional unit of an integrated system. said memory interface comprising:

multiple memory ports, at least one memory port being coupled to a dedicated memory and at least one memory port being coupled to a shared memory, said dedicated memory comprising a private memory for said functional unit and said shared memory comprising a common memory coupled to said functional unit and at least one-additional functional unit of said integrated system;

a receiver for receiving memory fetch requests from at least one requesting unit of said functional unit:

means for controlling forwarding each of a plurality memory fetch requests to one of said at least one memory port coupled to said dedicated memory or said at least one memory port coupled to said shared memory; and further comprising means for generating lookahead fetch requests within said memory interface employing information on said received memory fetch requests, said means for controlling forwarding including means for forwarding each of said lookahead fetch requests to one of said at least one port coupled to said dedicated memory or said at least one port coupled to said shared memory.

7. A memory interface for a functional unit of an integrated system, said memory interface comprising:

multiple memory ports, at least one memory port being coupled to a dedicated memory and at least one memory port being coupled to a shared memory, said dedicated memory comprising a private memory for said functional unit and said shared memory comprising a common memory coupled to said functional unit and at least one additional functional unit of said integrated system;

a receiver for receiving memory fetch requests from at least one requesting unit of said functional unit;

means for controlling forwarding each of a plurality memory fetch requests to one of said at least one memory port coupled to said dedicated memory or said at least one memory port coupled to said shared memory;

further comprising means for generating lookahead fetid requests within said memory interface employing information on said received memory fetch requests, said means for controlling forwarding including means for forwarding each of said lookahead fetch requests to one of said at least one port coupled to said dedicated memory or said at least one port coupled to said shared memory; and wherein said means for generating said lookahead fetch requests comprises:

a burst analyzer for analyzing said information on said memory fetch requests;

a logical address generator for generating lookahead fetch requests based on predefined information and said information on said memory fetch requests received; and lookahead request selector logic for determining whether to forward each generated lookahead fetch request to said means for controlling forwarding.

8. The memory interface of claim 7, wherein said means for controlling further comprises a physical address generator for generating physical address requests corresponding to said memory fetch requests received from said at least one requesting unit, and from said lookahead fetch requests.

9. The memory interface of claim 8, wherein said means for controlling further comprises a first queue for holding requests to said dedicated memory and a second queue for holding requests to said shared memory, and means for queuing each physical address request within one of said first queue and said second queue.

10. The memory interface of claim 9, wherein said means for controlling further comprises a reordering request dispatcher and a general bus interface, said first queue being coupled to said reordering request dispatcher and said second queue being coupled to said general bus interface, said reordering request dispatcher comprising means for reordering physical address requests held by said first queue for enhanced access bandwidth to said dedicated memory.

11. The memory interface of claim 10, wherein said reordering request dispatcher include s a lookahead/actual request mapper for determining whether a physical address request corresponding to a received memory fetch request is identical to a physical address request corresponding to a previously generated lookahead fetch request.

12. The memory interface of claim 10, wherein said reordering request dispatcher is coupled to said dedicated memory across a specialized memory controller, said specialized memory controller including data buffers for temporarily holding data fetched pursuant to lookahead fetch requests.

13. The memory interface of claim 13, wherein said dedicated memory comprises a multi-bank dynamic random access memory (DRAM).

14. The memory interface of claim 13, wherein said functional unit and said dedicated memory are on a common chip and said shared memory comprises external memory to said common chip.

15. The memory interface of claim 13, wherein said functional unit comprises a video decoder.

16. An integrated system coupled to a dedicated memory and a shared memory, said integrated system comprising:

a shared system data bus;

multiple functional units coupled to said shared system data bus for sending requests thereon to access said shared memory;

a wherein one functional unit of said multiple functional units includes a memory interface, said memory interface having multiple memory ports, one memory port of said multiple memory ports being coupled to said shared system data bus for sending requests thereon to access said shared memory, and one memory port of said multiple memory ports being coupled to said dedicated memory for sending requests thereto, said dedicated memory comprising a private memory of said one functional unit; and wherein said memory interface further comprises a first queue for said dedicated memory requests and a second queue for said shared memory requests, and a reordering request dispatcher for reordering said dedicated memory requests in said first queue for enhanced bandwidth utilization of a channel connecting said one memory port and said dedicated memory.

17. The integrated system of claim 16, wherein said one functional unit comprises a video decoder.

18. The integrated system of claim 16 wherein said dedicated memory is on a common chip with said functional unit, and wherein said shared memory comprises an external memory to said common chip.

19. The integrated system of claim 16, wherein said memory interface further comprises a lookahead request generator for generating lookahead fetch requests employing information from at least one actual request received by said memory interface from at least one requesting unit within said one functional unit.

20. A memory interface for a functional unit of an integrated system, said memory interface comprising:
- at least one memory port coupled to a dedicated memory, said dedicated memory comprising a private memory for said functional unit;
- a receiver for receiving memory fetch requests from at least one requesting unit of said functional unit;
- a lookahead request generator for generating non-sequential lookahead fetch requests within said memory interface using information on said received memory fetch requests and known memory access patterns; and
- a controller for forwarding each of said memory fetch requests and said lookahead fetch requests to said dedicated memory.

21. The memory interface of claim 20, wherein said at least one memory port comprises multiple memory ports, and wherein at least one memory port of said multiple memory ports is coupled to a shared memory, said shared memory comprising common memory for said functional unit and at least one additional functional unit of said integrated system, and wherein said controller comprises means for forwarding each of said memory fetch requests and said lookahead fetch requests to one of said dedicated memory or said shared memory, said forwarding being transparent to said at least one requesting unit of said functional unit.

22. The memory interface of claim 21, wherein said controller includes a physical address generator coupled to said receiver and to said lookahead request generator, said physical address generator generating a physical address request to one of said dedicated memory or said shared memory for each received memory fetch request and each lookahead fetch request.

23. The memory interface of claim 20, wherein said functional unit comprises a video decoder and said integrated system comprises a digital video decode system.

24. A memory interface for a functional unit of an integrated system, said memory interface comprising:
- at least one memory port coupled to a dedicated memory, said dedicated memory comprising a Private memory for said functional unit;
- a receiver for receiving memory fetch requests from at least one requesting unit of said functional unit;
- a lookahead request generator for generating lookahead fetch requests within said memory interface using information on said received memory fetch requests and known memory access patterns;
- a controller for forwarding each of said memory fetch requests and said lookahead fetch requests to said dedicated memory; and
- wherein said controller further includes a reordering request dispatcher for reordering said received memory fetch requests and said lookahead fetch requests to enhance bandwidth on a data channel connecting said at least one memory port to said dedicated memory.

25. The memory interface of claim 24, wherein said controller further comprises a specialized memory controller coupled between said reordering request dispatcher and said at least one memory port coupled to said dedicated memory, said specialized memory controller including a data buffer for temporarily holding data retrieved from said dedicated memory pursuant to said lookahead fetch requests.

26. The memory interface of claim 25, wherein said dedicated memory is divided into multiple banks and wherein said specialized memory controller includes multiple bank sequencing logic for optimizing bandwidth on said data channel.

27. The memory interface of claim 25, further comprising a feedback means for providing data utilization status from said request dispatcher to said lookahead request generator for dynamically adjusting generating of said lookahead fetch requests.

28. An integrated system coupled to a dedicated memory, said integrated system comprising:
- a functional unit coupled to said dedicated memory across a memory interface, said memory interface comprising:
  - at least one memory port coupled to said dedicated memory, said dedicated memory comprising a private memory to said functional unit;
  - a receiver for receiving memory fetch requests from at least one requesting unit of said functional unit;
  - a lookahead request generator responsive to said receiving memory fetch requests for generating non-sequential lookahead fetch requests within said memory interface using information from said received memory fetch requests and known memory access patterns of said functional unit; and
  - a controller for controlling forwarding of each memory fetch request and lookahead fetch request to said dedicated memory.

29. The integrated system of claim 28, wherein said functional unit comprises a video decoder.

30. The integrated system of claim 28, wherein said at least one memory port comprises multiple memory ports, one memory port of said multiple memory ports being coupled to said dedicated memory, and one memory port of said multiple memory ports being coupled to a shared memory, said shared memory comprising common memory for said functional unit and at least one additional functional unit of said integrated system.

31. The integrated system of claim 30, wherein said controller employs each fetch request of said memory fetch requests and said lookahead fetch requests to retrieve data from either said dedicated memory or said shared memory transparent to said at least one requesting unit.

32. An integrated system coupled to a dedicated memory, said integrated system comprising:
- a functional unit coupled to said dedicated memory across a memory interface, said memory interface comprising:
  - at least one memory port coupled to said dedicated memory, said dedicated memory comprising a private memory to said functional unit;
  - a receiver for receiving memory fetch requests from at least one requesting unit of said functional unit;
  - a lookahead request generator for generating lookahead fetch requests within said memory interface using information from said received memory fetch requests and known memory access Patterns of said functional unit;
  - a controller for controlling forwarding of each memory fetch request and lookahead fetch request to said dedicated memory; and wherein said controller further comprises a reordering request dispatcher for reordering said memory fetch requests and said lookahead fetch requests to enhance bandwidth on a data channel coupling said at least one memory port and said dedicated memory.

33. The integrated system of claim 32, wherein said controller further comprises a specialized memory controller coupled between said reordering request dispatcher and said at least one memory port coupled to said dedicated memory, said specialized memory controller including a data buffer for holding data retrieved from said dedicated memory pursuant to said lookahead fetch request.

34. The integrated system of claim 33, wherein said dedicated memory is divided into multiple banks of memory, and wherein said specialized memory controller includes multiple bank sequencing logic for maintaining bandwidth on said data channel coupling said at least one memory port to said dedicated memory.

35. A method for handling memory fetch requests within a functional unit of an integrated system, said functional unit being coupled to a dedicated memory and a shared memory across multiple memory ports, said method comprising:
   (a) receiving one of said memory fetch requests from at least one requesting unit of said functional unit;
   (b) determining whether to forward said memory fetch request to said dedicated memory across a first memory port or to said shared memory across a second memory port, said determining being transparent to said at least one requesting unit;
   (c) forwarding said memory fetch request to said first memory port, coupled to said dedicated memory or said second memory port coupled to said shared memory; and
   further comprising generating a lookahead fetch request using information on said received memory fetch request and known memory access patterns of said functional unit, and wherein said Forwarding comprises forwarding said lookahead fetch request to one of said first memory port coupled to said dedicated memory or said second memory port coupled to said shared memory.

36. The method of claim 35, wherein said memory fetch request contains a logical address, and wherein said method further comprises converting said logical address into a physical address request, and said forwarding comprises employing said physical address request to retrieve data from either said dedicated memory or said shared memory.

37. The method of claim 36, further comprising providing a first queue for said dedicated memory accesses and a second queue for said shared memory accesses, and queuing each physical address request within one of said first queue and said second queue.

38. A method for handling memory fetch requests of a functional unit of an integrated system, said functional unit being coupled to a dedicated memory through at least one memory port, said method comprising:
   receiving memory fetch requests from at least one requesting unit of the functional unit;
   generating non-sequential lookahead fetch requests for speculatively retrieving information from said dedicated memory using information on said received memory fetch requests and known memory access patterns; and
   controlling forwarding of each memory fetch request and lookahead fetch request to said dedicated memory for optimum bandwidth utilization on a channel coupling said at least one memory port and said dedicated memory.

39. The method of claim 38, wherein each memory fetch request and lookahead fetch request comprises a logical address, and wherein said method further comprises, for each fetch request, converting said logical address to a physical address request.

40. The method of claim 38, further comprising providing data utilization feedback from said controlling to said generating for use in dynamically adjusting said generating of said lookahead fetch requests.

41. The method of claim 38, wherein said functional unit is also coupled to a shared memory, and wherein said controlling comprises forwarding each fetch request to one of said dedicated memory or said shared memory transparent to said at least one requesting unit of the functional unit.

42. A method for handling memory fetch requests of a functional unit of an integrated system, said functional unit being coupled to a dedicated memory through at least one memory port, said method comprising:
   receiving memory fetch requests from at least one requesting unit of the functional unit;
   generating lookahead fetch requests for speculatively retrieving information from said dedicated memory using information on said received memory fetch requests and known memory access patterns;
   controlling forwarding of each memory fetch request and lookahead fetch request to said dedicated memory for optimum bandwidth utilization on a channel coupling said at least one memory port and said dedicated memory; and
   further comprising reordering said received memory fetch requests and said lookahead fetch requests for said optimal bandwidth utilization of said channel.

43. The method of claim 42, further comprising temporarily buffering data retrieved from said dedicated memory pursuant to said lookahead fetch requests within a specialized memory controller coupled to said dedicated memory.

44. A method for handling memory fetch requests of a functional unit employing a multi-ported memory interface, said functional unit being coupled to a dedicated memory and a shared memory through said multi-ported memory interface, said method comprising:
   sorting multiple memory fetch requests from at least one requesting unit of the functional unit into respective queues of said dedicated memory and said shared memory based on pre-determined memory allocation; and
   intelligently performing at least one reordering the memory fetch requests or generating non-sequential lookahead fetch requests based on known memory access patterns for the functional unit to enhance retrieval of data from said dedicated memory.

45. A memory interface for a functional unit of an integrated system, said memory interface comprising:
   at least one memory port coupled to one of a dedicated memory or a shared memory, said dedicated memory comprising a private memory for said functional unit;
   a receiver for receiving memory fetch requests from at least one requesting unit of said functional unit; and
   a controller for forwarding each of said memory fetch requests to one of said dedicated memory or said shared memory, wherein said controller further comprises a reordering request dispatcher for reordering said received memory fetch requests to enhance bandwidth on a data channel connecting said at least one memory port to said at least one dedicated memory or shared memory.

46. A method for handling memory fetch requests of a functional unit of an integrated system, said functional unit being coupled to at least one of a dedicated memory or a shared memory through at least one memory port, said method comprising:

receiving memory fetch requests from at least one requesting unit of the functional unit;

reordering said received memory fetch requests for optimum bandwidth utilization on a channel coupling said at least one memory port to said at least one dedicated memory or shared memory; and controlling forwarding of each memory fetch request using said reordering for optimum bandwidth utilization on the channel coupling the at least one memory port and the at least one dedicated memory or shared memory.

* * * * *

UNITED STATES PATENT AND TRADEMARK OFFICE
CERTIFICATE OF CORRECTION

PATENT NO. : 6,240,492 B1  
DATED : May 29, 2001  
INVENTOR(S) : Foster et al.

Page 1 of 1

It is certified that error appears in the above-identified patent and that said Letters Patent is hereby corrected as shown below:

Column 13,  
Line 51, delete the word "fetid" and insert -- fetch --

Column 14,  
Line 35, delete "13" and insert -- 12 --  
Line 50, delete "a" at the beginning of the sentence.

Column 15,  
Line 53, delete "P" in the word Private, and insert -- p --

Column 16,  
Line 62, delete "P" in the word Patterns, and insert -- p --

Column 17,  
Line 36, delete "F" in the word Forwarding, and insert -- f --

Signed and Sealed this

Twenty-ninth Day of January, 2002

Attest:

Attesting Officer

JAMES E. ROGAN  
Director of the United States Patent and Trademark Office